US006883736B1

(12) United States Patent
Blatt

(10) Patent No.: US 6,883,736 B1
(45) Date of Patent: Apr. 26, 2005

(54) DISTRIBUTION ASSEMBLY FOR PARTICULATE MATERIAL

(76) Inventor: Michael Scott Blatt, 5100 NE. 27th Ter., Lighthouse Point, FL (US) 33064

(*) Notice: Subject to any disclaimer, the term of this patent is extended or adjusted under 35 U.S.C. 154(b) by 0 days.

(21) Appl. No.: 10/227,729

(22) Filed: Aug. 26, 2002

(51) Int. Cl.[7] ......................... A01C 15/04; A01C 3/06; A01G 25/09; E01C 19/16; E01H 3/02

(52) U.S. Cl. ...................... 239/654; 239/172; 222/626; 222/637; 406/153

(58) Field of Search ................................ 239/654, 172, 239/176, 650, 655, 661, 689, 146, 722, 302, 239/407, 142, 143, 578, 124, 126, 127; 222/626, 222/637; 406/153, 127, 145, 43, 192, 198

(56) References Cited

U.S. PATENT DOCUMENTS

| | | | | | |
|---|---|---|---|---|---|
| 2,391,048 | A | * | 12/1945 | Vose | 239/654 |
| 3,206,255 | A | * | 9/1965 | Gray | 406/93 |
| 3,305,140 | A | * | 2/1967 | Johnson | 406/24 |
| 3,504,945 | A | * | 4/1970 | Leibundgut et al. | 406/144 |
| 3,542,250 | A | * | 11/1970 | McRitchie | 239/654 |
| 4,249,839 | A | * | 2/1981 | Vance | 406/109 |
| 4,387,852 | A | | 6/1983 | Mattson et al. | |
| 4,474,327 | A | | 10/1984 | Mattson et al. | |
| 4,809,913 | A | | 3/1989 | Gunlock | |
| 4,834,004 | A | * | 5/1989 | Butuk et al. | 111/200 |
| 4,913,356 | A | | 4/1990 | Gunlock | |
| 5,092,526 | A | | 3/1992 | Takata | |
| 5,190,225 | A | * | 3/1993 | Williams | 239/653 |
| 5,351,890 | A | | 10/1994 | Clements | |
| 5,931,393 | A | | 8/1999 | Alsip et al. | |
| 5,947,384 | A | | 9/1999 | McCauley | |
| 5,964,420 | A | | 10/1999 | Hampton | |
| 6,070,814 | A | | 6/2000 | Deitesfeld | |
| 6,283,679 | B1 | | 9/2001 | Gregor | |
| 6,343,896 | B1 | * | 2/2002 | Goodier et al. | 406/43 |
| 6,343,897 | B1 | | 2/2002 | Cutler | |

* cited by examiner

*Primary Examiner*—David A. Scherbel
*Assistant Examiner*—Darren Gorman
(74) *Attorney, Agent, or Firm*—Malloy & Malloy, P.A.

(57) ABSTRACT

An assembly for distributing particulate material comprising a blower assembly which is preferably removably mounted on a mobile platform and structured to generate a forced flow of air along a flow path and through a manifold assembly connected to a supply of material being distributed. The manifold assembly includes a receiving segment incorporating a Venturi section facilitating the entrainment of the material into the forced air flow passing through a discharge conduit preferably having an extended length to facilitate distribution of the material to a plurality of locations in a variety of different environments. A vent assembly is provided to relieve back pressure from within the discharge conduit, which may be created due to its extended length.

15 Claims, 4 Drawing Sheets

DISTRIBUTION ASSEMBLY FOR PARTICULATE MATERIAL

BACKGROUND OF THE INVENTION

1. Field of the Invention

This invention relates to an assembly for distributing fertilizer, as well as a large variety of other particulate materials, which is adaptable to be mounted on different types of ground or water traveling vehicles. The distribution assembly is structured to regulate the entrainment of the particulate material into a forced air flow which serves to distribute the material throughout significantly large and/or hard to reach areas.

2. Description of the Related Art

Air blower assemblies are well known and have been used for a variety of applications for many years. Typically, such devices are of relatively light weight constructions and as such are portable, being typically hand held or otherwise supported on a users body. In operation, such devices include the provision of an impeller which draws air into a housing and out through a housing outlet commonly associated with an elongated nozzle or like flow directing structure. The air is expelled at a significantly high flow rate in order to create an air stream having sufficient force to remove leaves, dirt and a variety of other types of debris from driveways, walkways and other surface areas.

The extensive use of known blower assemblies has led to their adaptation for numerous applications, other than that described above. More specifically, attempts have been made to structurally modify conventional blower assemblies for use either in a vacuum mode or in a forced air discharge mode, respectively intended to either collect or disperse debris and like materials. In addition to the above, blower devices have been found to be particularly useful, when structurally modified in the proper manner, to aid in the dispersement of various types of materials. Appropriately modified blowers intended for this use serve to supplement manual seed and/or fertilizer spreaders commonly employed to plant and maintain lawns, grass turf or the like. Therefore, it is generally recognized that the high velocity air stream generated by the typical blower assembly provides a versatile and efficient means of distributing materials throughout a wide variety of areas, not capable of being serviced by more conventional spreaders.

While such prior art attempts may be considered to be at least minimally operative in accomplishing their intended purpose, devices of this type lack versatility and have been found to be less than efficient. Other disadvantages associated with spreaders incorporating a forced air flow is an inability to adequately regulate delivery of the intended material due at least in part to an inconsistent feeding control of material to the generated air stream. This type of ineffective performance results in an uneven distribution of materials throughout the area being serviced.

In addition, it has been found that attempted modifications to incorporate a blower commonly require the use of relatively short discharge nozzles, which limits the range or area throughout which the particulate material may be effectively spread. As a result, areas which are more difficult to reach must be serviced by personnel manually carrying a blower/spreader. However, due to the high rate of material discharge, a large quantity of material can be discharged in a short period of time. Therefore unless an operator can carry a significantly large quantity of the material being dispersed, the operator must repeatedly return to a supply area for replenishment of the material in order to properly service terrain which is not easily accessible. Accordingly it is obvious that such body supported assemblies, while being capable of reaching isolated areas, are not consistently operative for a long period of time and are therefore not practical.

Based on the above, there is a significant need for an assembly capable of effectively distributing particulate material having a wide range of particulate sizes, wherein such an improved distribution assembly maintains efficient control of the supply flow to a generated air stream and thereby distributes the particulate material consistently throughout an area targeted for treatment. Further, such a preferred or improved distribution assembly should include operative and structural components which allow the dispersal area to be greatly increased over that available using conventional spreaders. Also, a preferred distribution assembly of the type set forth herein should have the structural and operational versatility to be used in combination with a variety of different vehicles or like mobile platforms in order to spread various materials over different ground surfaces and/or throughout a water environment. Further, such an improved distribution assembly should be easily converted, without structural modification, for use as a blower, in the conventional fashion, or for use as a spreader as described above. Finally, when utilized with a mobile platform, the improved distribution assembly of the type set forth herein should be easily mounted on and removed from the platform in order that the mobile platform can be used in the performance of other applications for which it may have been originally designed.

SUMMARY OF THE INVENTION

The present invention is directed to an assembly structured to rapidly and efficiently distribute a variety of different particulate materials such as, but not limited to, fertilizer and the like by utilizing a blower assembly in combination with a uniquely structured manifold assembly. Further, the distribution assembly of the present invention overcomes many, if not all, of the disadvantages and problems associated with conventional or known particulate spreaders. In doing so, the distribution assembly may be used independently of or be mounted on any of a variety of different mobile platforms including wheeled vehicles or structures which are motorized or manually powered, as well as various types of marine craft. Accordingly, depending on the specific application, the distribution assembly of the present invention can be utilized to disperse particulate material of various types and sizes both over an extended ground surface or throughout a water environment.

In order to fully emphasize the versatility of the distribution assembly of the present invention, specifically relating to the size and type of material capable of being dispersed, the following provides examples of materials which may be effectively used with the subject distribution assembly. However, the following material sizes, categories, etc. are not meant to be all inclusive but are representative only of the wide range of particulate materials which may be dispersed in the intended fashion. More specifically, materials that can be distributed by the distribution assembly of the present invention include fertilizer for turf and ornamental plants, herbicides, pesticides, fungicides, rock salt, aquatic herbicide materials, agriculture materials, forestry grade fertilizers, pelletized fish food and marine nutritional supplements, minor elements, organic fertilizers, seed, granular wetting agents, granular baiting material, as well as others. The size of the particulate material capable of being dispersed through the use and application of the distribution assembly of the present invention includes dust, powder, mini-pill, micro-pill, standard pill, homogeneous blend fertilizers, sand, etc. As such, the distribution assembly may be applicable for use in a variety of different areas including business segments associated with pest control, landscaping, turf management, nurseries, municipalities, home owner associations, golf courses, theme parks, athletic fields, fisheries, aquatic control companies, tree farms, etc. Also, the distribution rate of the particulate material which passes through the distribution assembly is generally in the range of substantially 30 or more pounds per minute, depending upon the length of the discharge conduit and the blower size.

The operational versatility of the distribution assembly of the present invention is further enhanced by at least some of the components thereof being removably secured to a mobile platform and being otherwise structured such that the user has the ability to control the use of the distribution assembly in direct association with various types of mobile platforms. In addition, the cooperative structuring of the distribution assembly and the mobile platform allows the mobile platform to operate in its normally intended fashion, when the distribution assembly attached thereto is temporarily and purposefully rendered inoperative. The ability to adapt the subject distribution assembly to a variety of different vehicles allows access to almost any land surface or body of water where appropriate vehicles can travel.

Accordingly, the distribution assembly of the present invention comprises a blower assembly structured to generate a substantially high velocity stream of air along a predetermined flow path. The predetermined flow path is at least partially defined by a plurality of operative components connected to one another, such that the generated air flow passes from the blower assembly along the predetermined flow path to a discharge conduit. Further, in order to overcome additional recognized disadvantages and problems associated with known particulate material spreaders, the discharge conduit may be made from a flexible, high strength, durable material and be of an extended length. The extended length of the discharge conduit facilitates the particulate material being delivered directly from a high capacity material supply throughout a wide area of dispersal. Also, the flexibility of the elongated delivery conduit allows it to be selectively disposed into any of an almost infinite number of positions or orientations in outwardly extending, substantially surrounding relation to the blower assembly and to the mobile platform on which the blower assembly and remaining components of the distribution assembly are mounted.

The distribution assembly further includes a manifold assembly interconnected in fluid communication with the blower assembly downstream thereof. Further, the manifold assembly is interconnected upstream of the discharge conduit and is structured to regulate the flow of air as well as the flow of material to and along the predetermined flow path and/or at least a portion thereof extending from the manifold assembly to the exit or discharge end of the discharge conduit. The manifold assembly includes a delivery conduit connected in communicating relation with the interior of a supply container in which the supply of material is maintained. The supply container, as indicated above, can be a part of the vehicle or mobile platform used to position and support the distribution assembly and can vary in size, capacity, configuration, etc. Preferably, the material supply container and the delivery conduit of the manifold are cooperatively disposed and structured to allow passage of the material into the delivery conduit by means of gravity flow and/or under the influence of a negative pressure. To adequately regulate flow of the particulate material through the delivery conduit and the associated manifold assembly, a valve assembly is disposed between the material supply and the delivery conduit. The valve assembly can be operated from a location on or off the mobile platform from a location spaced from the manifold assembly and the material container.

The manifold assembly further includes a receiving segment disposed directly within and defining at least a portion of the aforementioned predetermined flow path along which the generated air stream from the blower assembly travels. The receiving segment is connected in fluid communication with the delivery conduit, such that the material passing into the delivery conduit will travel downstream from the delivery conduit to the interior of the receiving segment. In at least one preferred embodiment of the present invention, the receiving segment includes a Venturi section characterized by a restricted or reduced diameter throat portion disposed along the flow path. Reduced pressure resulting from the well known Venturi effect will communicate with the delivery conduit, further facilitating passage of the particulate material there along to a location where it is entrained within the air stream and predetermined flow path. Once so entrained, the particulate material passes along the extended length of the discharge conduit until it exits from the outer, open end thereof.

As set forth therein an extended length of the discharge conduit enhances the versatility of the distribution assembly of the present invention by allowing the material to be spread over a larger dispersal area and into relatively hard to reach locations not previously obtainable using conventional or known spreader assemblies. Accordingly, one feature of a preferred embodiment of the present invention is structuring of the manifold assembly to include adequate venting, through the provision of a vent assembly. The vent assembly is structured to reduce the buildup of back pressure within the elongated discharge conduit and/or the manifold assembly itself.

Due to the extended length of the discharge conduit, rapid flow rate of the air stream passing along the flow path, and the orientation of the discharge conduit, the significantly large quantity of material being continuously channeled into the discharge conduit may result in a tendency of the particulate material to "backup" or collect in the discharge conduit. Such material backup may be especially prevalent if dispersal of material from the discharge conduit is not done on a prolonged or continuous basis. The occurrence of such material backup produces the aforementioned back pressure within a length of discharge conduit. The existence of back pressure will frequently cause in a back flow of material into and at least partially through the manifold assembly and possibly through the delivery conduit into the material supply container. The provision of the vent assembly connected to or incorporated within the manifold assembly provides an automatic release of the back pressure whether it originates along the length of the discharge conduit or at any point along the predetermined flow path, including the manifold assembly. In at least one preferred embodiment of the present invention the vent assembly communicates between the interior of the delivery conduit and atmosphere on the exterior of the manifold assembly.

The distribution assembly of the present invention is thereby structured to efficiently disperse particulate material of varying sizes and types throughout both a land or water environment. The operational characteristics of the distribution assembly of the present invention is further enhanced by being structured for use in combination with or independently of a variety of different mobile platforms including land or water traveling vehicles. Also, in some relatively specialized applications, such as tree farms, groves, orchards, etc, a plurality of distribution assemblies may be mounted on the same vehicle and be concurrently but independently operated.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
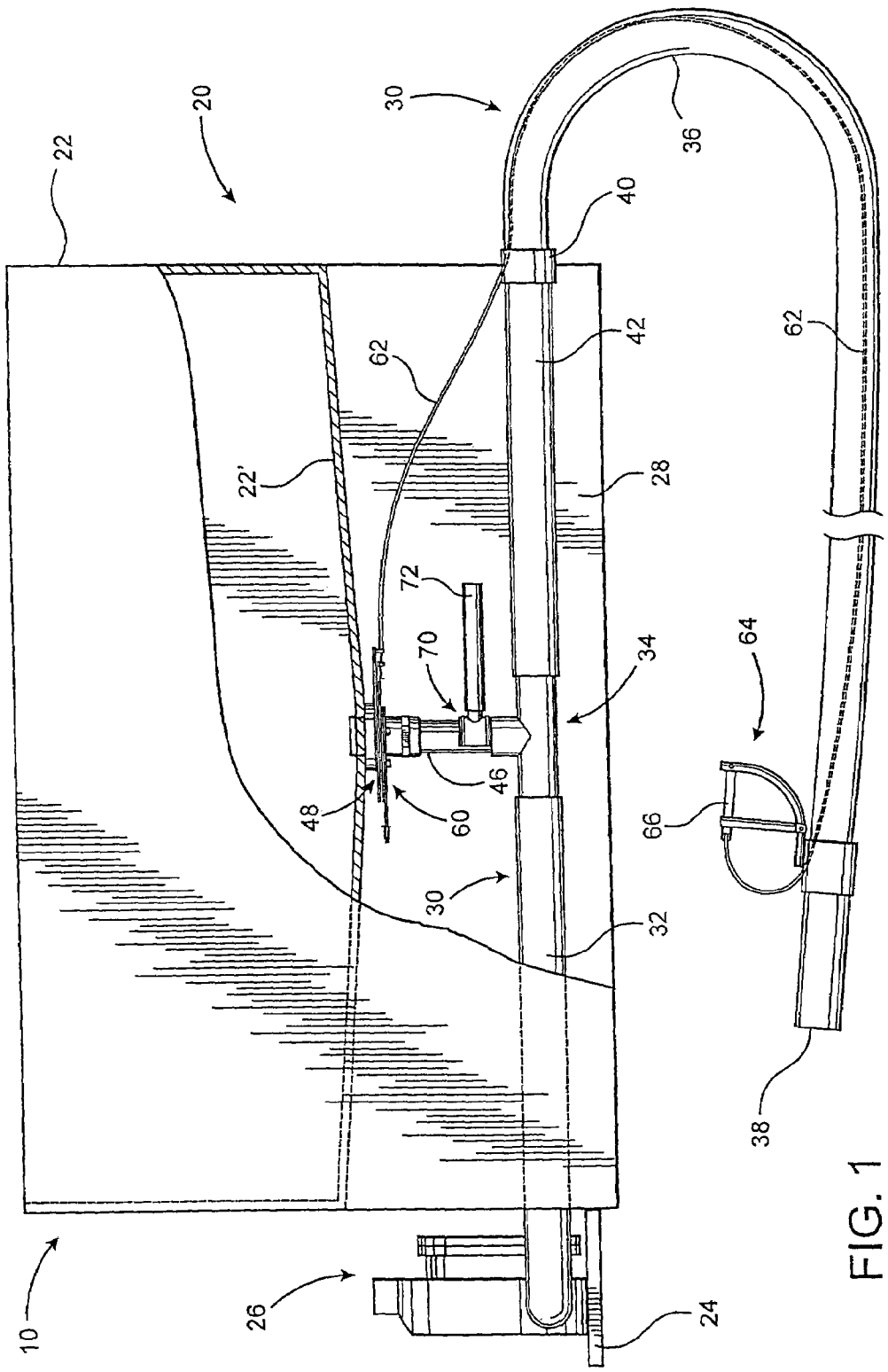
FIG. 1 is a side view in partial schematic form of a distribution assembly of the present invention mounted in combination with a material supply and adapted to be mounted on a variety of different vehicles or mobile platforms.

As shown in the accompanying Figures, the present invention is directed to a distribution assembly, generally indicated as 10 in FIG. 1, which is structured to distribute a wide range particulate materials such as, but not limited to, fertilizer and the like. As will be further evident from the following description of the one or more preferred embodiments of the present invention, the distribution assembly 10 may be mounted on any of a variety of different mobile platforms.

Figure 3:
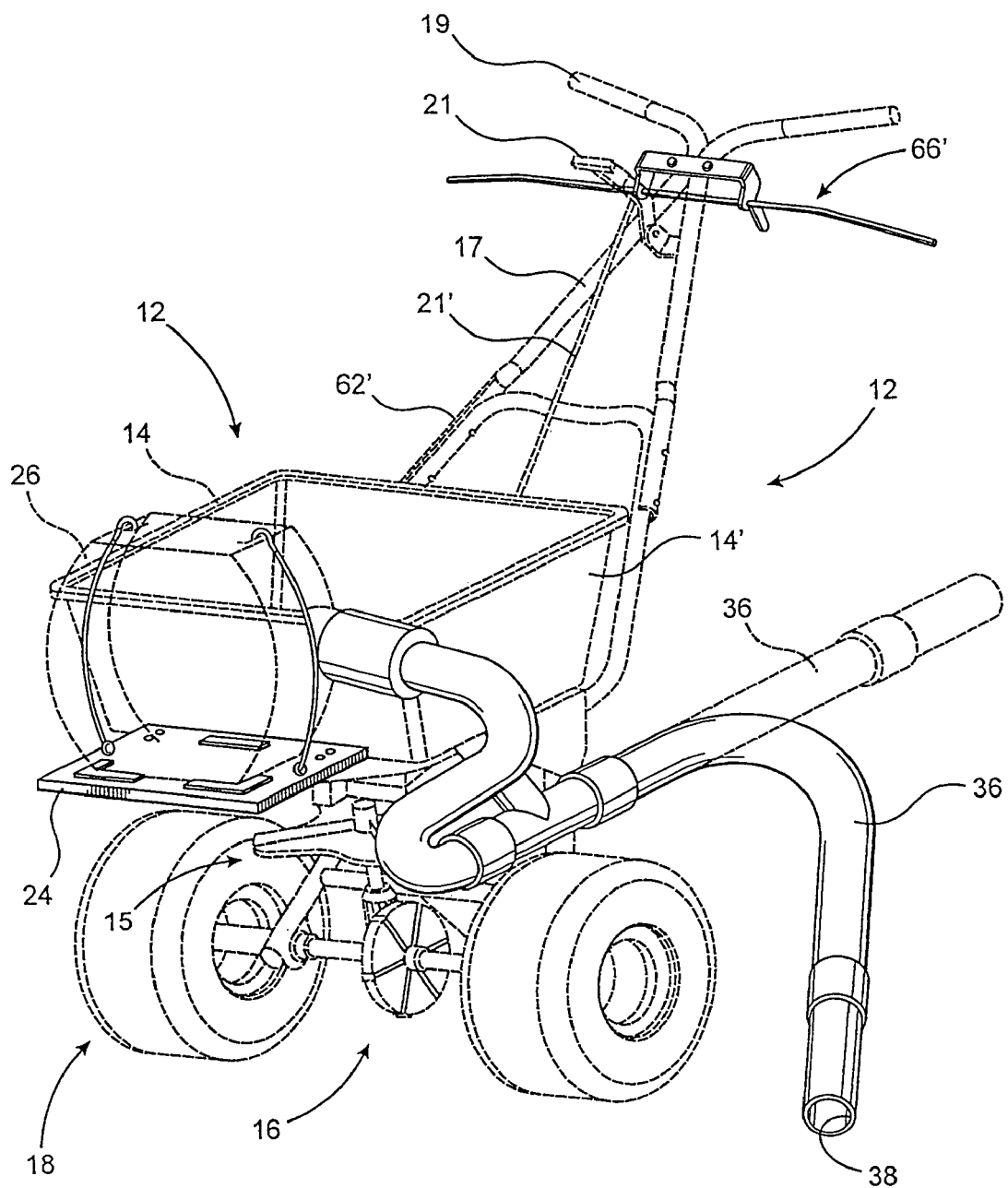
FIG. 3 is a perspective view in partial phantom of a mobile platform in the form of a manually propelled vehicle of the type readily adaptable for the mounting of the distribution assembly of the present invention thereon.
Figure 4:
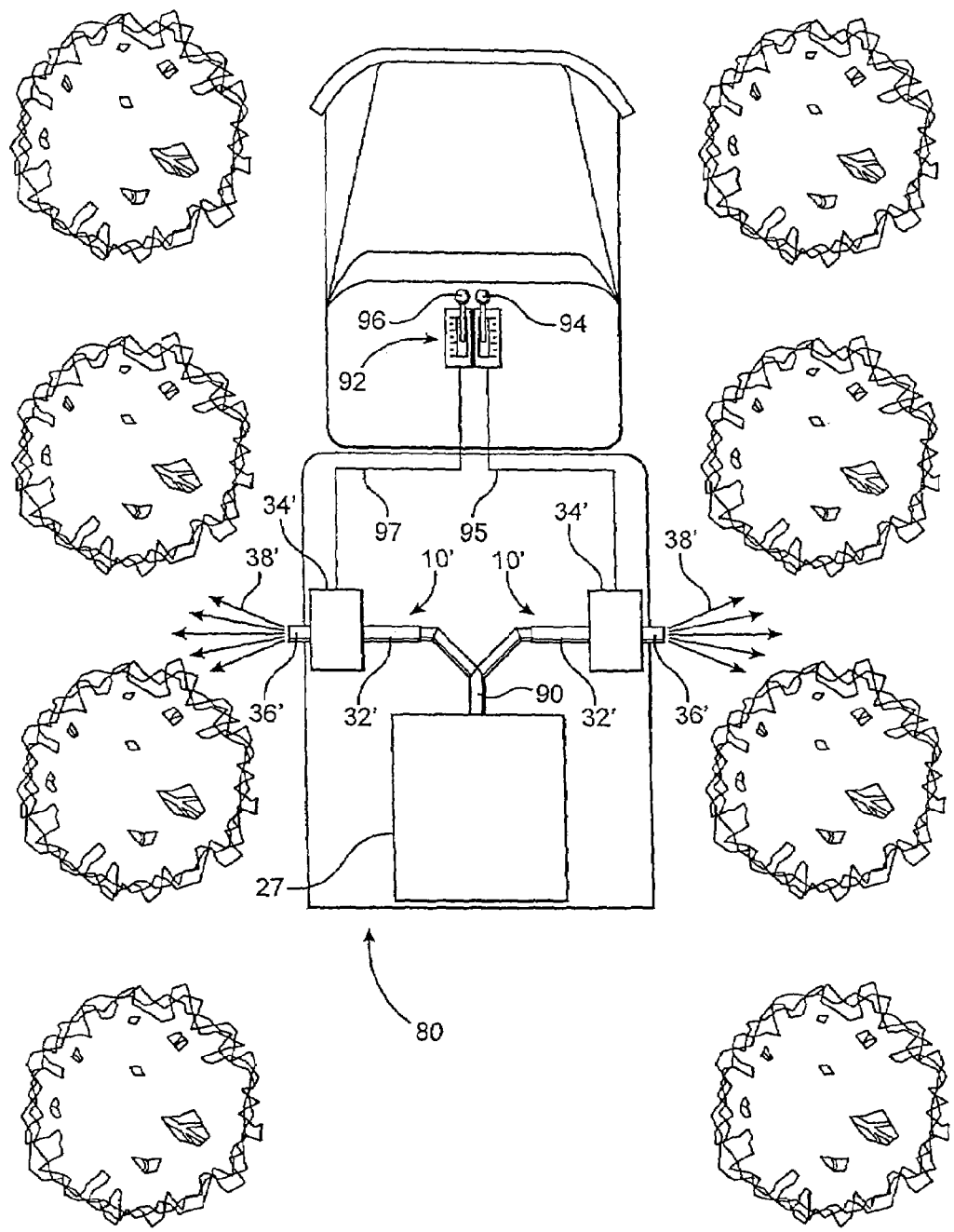
FIG. 4 is a top view in schematic form of yet another preferred embodiment of the distribution assembly of the present invention.

By way of example, such mobile platforms may include, but are not limited to, a manually powered spreader assembly generally indicated as 12 in FIG. 3 and a truck or other motorized vehicle generally indicated as 80 in FIG. 4. The adaption of the distribution assembly of the present invention, including the various preferred embodiments thereof will be described in greater detail hereinafter, with primary references to the appropriate Figures. In addition to the embodiments of FIGS. 3 and 4, the distribution assembly 10 of the present invention may be mounted on a mobile platform in the form of a marine craft. As such, the particulate material may be spread throughout a predetermined water environment, such as when it is desired to distribute aquatic herbicide materials, pelletized fish food and/or nutritional supplements, etc.

Accordingly, the structural and operational versatility of the distribution assembly 10 is further demonstrated by being connected to or mounted on a mobile platform generally indicated as 20, which is intended to be representative of any of a variety of different mobile platforms with which the distribution assembly of the present invention may be used. The mobile platform 20 includes a material supply 22, a support platform 24 for the mounting and/or support of a blower assembly 26 and an under carriage area generally indicated as 28. The under carriage area 28 may of course also vary greatly dependent on the type, category, structure, size, etc. of the mobile platform 20 on which the distribution assembly 10 of the present invention is mounted.

The blower assembly 26 may be of the type typically associated with hand held or portable blowers used to generate a forced flow of air for purposes of removing debris from lawn surfaces, walkways, driveways, etc. However, the blower assembly 26 is clearly not intended to be limited to any specific type of blower assembly other than that capable of generating an air stream with a sufficient force to travel along a predetermined flow path and outwardly therefrom for an acceptable distance.

The predetermined flow path is generally indicated as 30 and includes an adaptor section or conduit 32 and a manifold assembly generally indicated as 34. The adaptor section 32 is connected between the blower assembly 26 and the manifold assembly 34 and defines at least a portion of the predetermined flow path 30. In addition, the distribution assembly 10 further includes a discharge conduit 36 preferably formed from a flexible material and also having what may be referred to as an extended length. The extended length of the discharge conduit 36 may vary but preferably includes a longitudinal dimension of at least approximately five feet and greater.

The flexibility and extended length of the discharge conduit 36 allows variable positioning thereof relative to the mobile platform 20 on which it is mounted. As such, the particulate material being distributed may exit the outlet or discharge end 38 and be delivered to a variety of different locations throughout an extended range or area of distribution surrounding the mobile platform 20. Discharge conduit 36 may be fixedly or removably connected to the manifold 34 such as by a connection 40. The discharge conduit 30 is connected in fluid communication to the manifold 34 by a second adaptor conduit 42. The second adaptor conduit 42 may be an integral part of the discharge conduit 36 or may be fixedly or removably attached to the manifold assembly 34 dependent, at least in part, on the structure, size and/or configuration of the mobile platform 20 to which the distribution assembly 10 is attached.

One feature of a most preferred embodiment of the present invention comprises the manifold assembly 34 shown in detail in FIG. 2. The manifold assembly 34 includes a delivery conduit 46 having an open, hollow interior connected as at 48 to a base or side wall portion 22' of a material supply 22. Through such connection, the particulate material is allowed to flow into the interior of the delivery conduit 46, along its length and exit from an outlet end 50. The outlet 50 extends into the interior of the receiving segment 52 and includes an angular orientation or configuration facing downstream of the aforementioned predetermined flow path 30.

Further, the receiving segment 52 includes a Venturi section 54 defined by a restricted or reduced diameter throat portion 56. Provision of the Venturi section 54 within the receiving segment 52 creates a negative pressure caused by the well known Venturi effect. The resulting negative pressure is communicated to the interior of the delivery conduit 46 further facilitating removal of the particulate material from the delivery conduit 46. The material is drawn through the open outlet end 50 and into the forced air flow as schematically represented by the directional arrow 58. The particulate materials enters the predetermined flow path as it is entrained within the forced flow of air created by the blower assembly 26.

Figure 2:
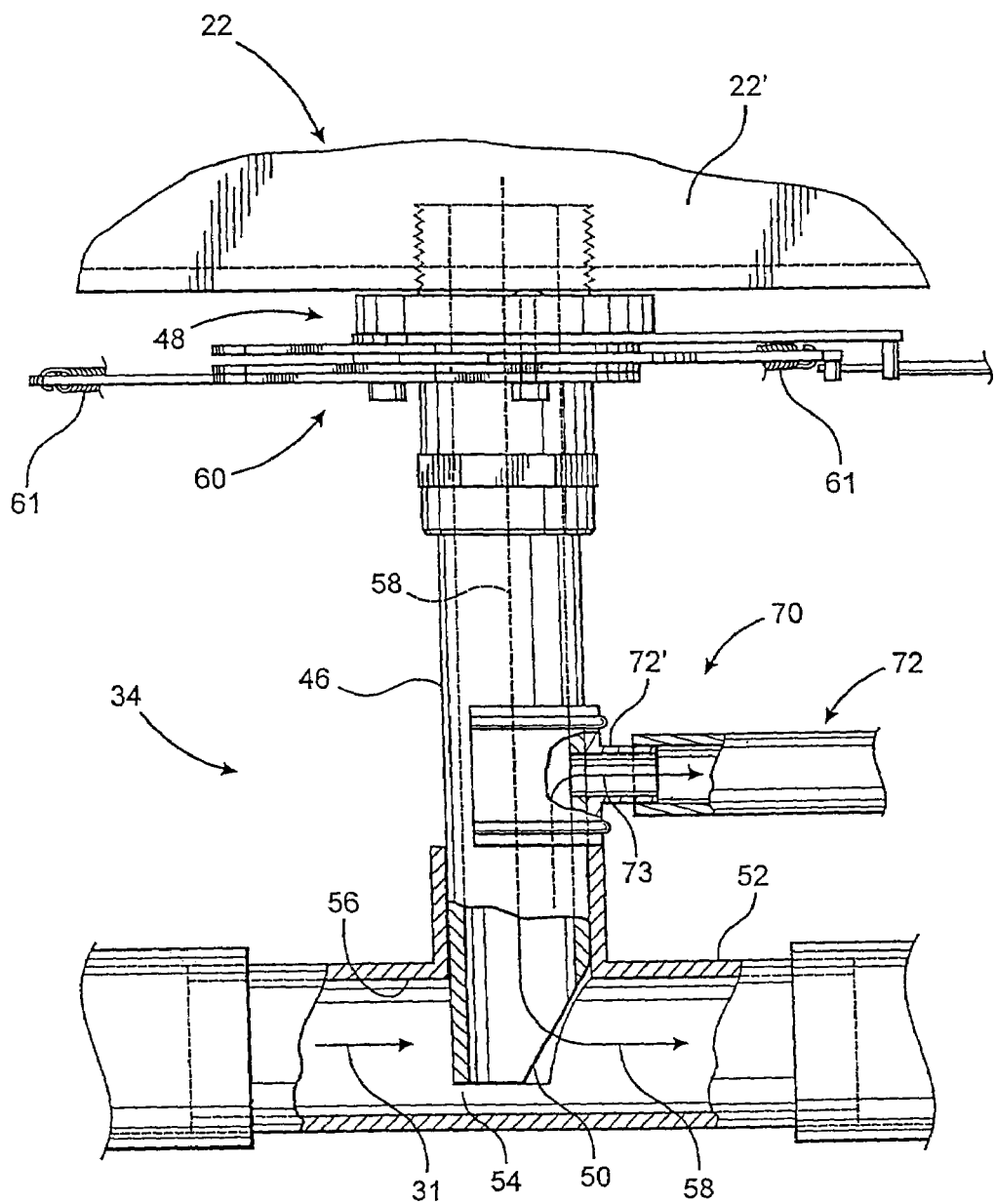
FIG. 2 is a detailed view of manifold assembly associated with the preferred embodiment of FIG. 1.

Other structural features associated with the distribution assembly 10 and in particular the manifold assembly 34 comprise the provision of a valve assembly generally indicated as 60. The valve assembly 60 is preferably spring biased or otherwise structured to be normally disposed in a closed position as shown in FIG. 2. As set forth above, the base 48 is secured to a bottom or side wall 22' of a material supply 22. As also set forth above, the valve assembly 60 is normally biased, due to the provision of a biasing spring 61, into a closed position thereby preventing the gravity or negative pressure flow of particulate material from the material supply 22 into the manifold assembly 34.

With reference to FIG. 1, the valve assembly 60 includes a control assembly including a control line in the form of a wire, cable, etc. and indicated as 62. The control line 62 extends to a location generally remote from the manifold assembly 34 and material supply 22. Depending on the particular embodiment being utilized, the control line 62 may extend along the discharge conduit 36 and may terminate adjacent to the discharge end 38. The control assembly further includes an operative control handle, which may assume a variety of different structures, generally indicated as 64. Control handle 64 serves to operate and/or selectively orient the control line 62 so as to selectively open or close the valve assembly 60. As indicated, the control handle 64 is manually operable and may also be spring biased as at 66. Therefore, a squeezing action or other manipulation exerted on the control handle 64 serves to pivot the valve assembly 60 into an open position and a release of the control handle 64 positions the valve assembly 60 into its normal, closed position.

Another feature of the present invention is the provision of a vent assembly generally indicated as 70. The vent assembly 70 is connected in fluid communication to the interior of the delivery conduit 46 and preferably between its opposite ends. The vent assembly 70 preferably includes a vent conduit 72 extending outwardly from its fluid communication with the interior of delivery conduit 46 to a location exterior of the manifold 34. The vent assembly 70 is disposed and structured to release any back pressure to an exterior of the manifold assembly 34 existing within the discharge conduit 36 or the manifold assembly 34 itself.

Numerous factors, such as the extended length of the discharge conduit 36, the flow rate of the particulate material passing along the flow path 30, and possibly the orientation of the discharge conduit 36 may cause at least some of the particulate material to "back-up" or become at least temporarily collected within the discharge conduit 36. As a result of the forced flow of air 31, schematically represented by the directional arrow in FIG. 2, continuously passing through and along the predetermined flow path 30, there may be a build-up of back pressure. Such back pressure may extend through and into the manifold assembly 34 and have a tendency to force air flow, as well particulate material, in a reverse direction, up through the delivery conduit 46, as schematically represented by the directional arrow 73.

In order to prevent a back-up of the particulate material into the material supply 22, the vent assembly 70 serves to release any backpressure and/or back flow of air and material through the manifold assembly 34. The back flow may pass from the discharge conduit 36, through the vent assembly 70. More specifically, the back flow of air and material, due to the existence of backpressure along the path of fluid flow 30, may pass from the interior of the delivery conduit 46 to the exterior of the manifold assembly 34 through the vent conduit 72. As represented in both FIGS. 1 and 2, the vent assembly 70 maintains fluid communication with the interior of the manifold assembly 34 and the delivery conduit 46 and in doing so may assume a variety of different structures, dimensions and configurations. Other structural features of the vent assembly 70 may include a connecting conduit as at 72' integrally connected to the delivery conduit 46 at a location intermediate the opposite ends thereof. Such adaptor segment 72' may be fixedly or removably connected to the vent conduit 72 as shown in FIG. 2.

Again it is to be emphasized that the versatility of the distribution assembly 10 of the present invention is further evident by its ability to be either removably or fixedly secured to any of a variety of different mobile platforms such as 12, 20, etc. By way of example, when mounted on the manually powered mobile platform 12, as demonstrated in FIG. 3, the adaptor assembly 34 would be attached in an area generally associated with the under carriage, such as at 15. Similarly, the support platform 24 for the blower assembly 26 may be secured to any preferred portion or surface 14' of the material supply 14 or other part of the mobile platform 12.

With further reference to FIG. 3, the spreader assembly 12' includes a material supply container 14 and a spreader mechanism generally indicated as 16. With or without the presence of the distribution assembly 10, the spreader mechanism 16 is interconnected by appropriate gearing to the wheel support mechanism 18 in a known manner. Material delivered by gravity from the material supply 14 is distributed by the spreader mechanism 16 in corresponding relation to the speed of travel of the spreader assembly 12'. Therefore, the spreader assembly 12' may operate in the conventionally intended fashion, even when the distribution assembly 10 of the present invention is mounted thereon, simply by maintaining the valve assembly 60 in its normally closed position. A control handle and associated positioning rod or member 21 and 21' serve to release the material within the material supply 14 to the spreader mechanism 16, in the conventional and intended manner.

However, when it is desired to activate or operate the distribution assembly 10 while supported on the mobile platform 12 of FIG. 3, the control handle and control member 21' are oriented in a closed position. A spring biased control handle 66' is manually operable to selectively dispose the valve assembly 70 into either the aforementioned open or closed positions thereby controlling the flow of particulate material from the material supply 14 into the manifold assembly 34. For purposes of clarity the valve assembly, manifold assembly and other operative components of the distribution assembly 10, as described in FIGS. 1 and 2 are not shown in FIG. 3. In use, an appropriate control line 62' associated with the valve assembly 60 may extend along the handle assembly 17 of the mobile platform 12. The control line 62' is attached to the aforementioned control handle 66' which is moveably mounted within the reach of the hands of the user, relative to the handlebar structure 19.

As disclosed in the embodiment of FIG. 3, as well as the other preferred embodiments of the present invention, the discharge conduit 36 is preferably of extended length. Also, the discharge conduit is preferably formed of a flexible material thereby facilitating its orientation into any of an almost infinite number of positions during the distribution process. However, as set forth above, due to its extended length and flexibility, certain orientations of the discharge conduit 36, such as that represented in phantom lines of FIG.

3, may also facilitate the backup of material within the discharge conduit 36, resulting in the creation of backpressure, as set forth above. Accordingly, the provision of the venting assembly 70 is disposed and structured to relieve such conditions.

FIG. 4 discloses another application of the present invention wherein a plurality of distribution assemblies each represented as 10', are mounted on a mobile platform, generally indicated as 80, in the form of a truck or other motorized vehicle. Each of the distribution assemblies 10' include an independent manifold assembly schematically indicated as 34' receiving forced air flow at least one common blower assembly mounted on or within a housing as at 27. When a single blower assembly is utilized an appropriate connection as at 90 may be provided so as to provide the forced air flow from the blower assembly/housing 27 to the individual manifold assemblies 34'. In addition, each of the manifold assemblies 34' are supplied with the forced flow of air by separate conduits or adapters 32'. Also, discharge conduits and the discharge ends thereof 36' and 38' respectively, are located downstream of respective ones of the manifold assembly 34' and are positioned so as to concurrently direct particulate material outwardly therefrom into a predetermined distribution area. By way of example, the distribution areas are schematically represented by adjacent rows of trees or like plants. Naturally, the specific location of the discharge conduits 36' may be altered and/or selectively adjustable dependent upon the particular application and location of the respective distribution areas which they are intended to cover.

Also, a control assembly generally indicated as 92 may include a single control assembly but more preferably comprises separately operable control handles 94 and 96. Each of the control handles 94 and 96 are connected by a control line 95 and 97 to a material flow regulating valve assembly (not shown) associated with each of the manifold assemblies 34'. Accordingly, the control assembly 92 allows for the concurrent and/or independent operation of each of the distribution assemblies 10' so as to independently control or regulate the particulate material issuing from each of the discharge conduits 36' as shown.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described.

What is claimed is:

1. An assembly structure to distribute particulate material, said assembly comprising:

a) a mobile platform including a material supply, b) at least one blower assembly mounted on said mobile platform and structured to generate a forced flow of air along predetermined flow paths, c) a plurality of manifold assemblies mounted on said mobile platform each including a delivery conduit disposed and structured to channel material from said material supply to a corresponding one of said predetermined flow paths, d) each of said manifold assemblies further including a receiving segment disposed in material receiving relation to said delivery conduit and positioned to define at least a portion of said predetermined flow path, e) separate discharge conduits each connected to a different one of said manifold assemblies downstream thereof along said predetermined flow path and in material receiving relation thereto, f) a vent assembly connected to each of said manifold assemblies and disposed and structured to vent backpressure therethrough from a corresponding one of said discharge conduits, and g) a control assembly interconnected to each of said manifold assemblies and structured to initiate concurrent or independent discharge of particulate material therethrough.

2. An assembly as recited in claim 1 further comprising a valve assembly disposed between each of said delivery conduits and the material supply and structured to regulate material flow to each of said manifold assemblies.

3. An assembly as recited in claim 1 wherein said blower assembly is removably mounted on said mobile platform.

4. An assembly as recited in claim 3 wherein each of said discharge conduits is removably connected to a corresponding one of said manifold assemblies.

5. An assembly as recited in claim 4 wherein each of said manifold assemblies is fixedly connected to said material supply.

6. An assembly as recited in claim 1 further comprising a Venturi section mounted within each of said receiving segments along corresponding ones of said flow paths and in fluid communication with said delivery conduits.

7. An assembly as recited in claim 6 wherein each of said delivery conduits comprises an outlet extending inwardly into said Venturi section and being angularly oriented to face downstream of said predetermined flow path.

8. An assembly as recited in claim 1 wherein each of said vent assemblies is connected to a corresponding one of said delivery conduits in spaced relation to a corresponding one of said receiving segments.

9. An assembly as recited in claim 8 wherein each of said vent assemblies is connected between and in fluid communication with an interior of said delivery conduit and an exterior of said manifold assembly.

10. An assembly as recited in claim 1 wherein each of said predetermined flow paths comprises an adaptor section extending between said blower and a corresponding one of said manifold assemblies.

11. An assembly as recited in claim 10 wherein said discharge conduits are each movable relative to corresponding ones of said manifold assemblies, said blower assembly and said mobile platform into a plurality of different orientations for selective distribution of the material into a variety of locations.

12. An assembly as recited in claim 11 wherein said discharge conduits have an extended length and are formed of a flexible material.

13. An assembly as recited in claim 12 wherein said discharge conduits are movable along at least the majority of their length.

14. An assembly as recited in claim 1 wherein each of said discharge conduits has an extended length and is movable along at least a majority thereof relative to said blower assembly.

15. An assembly as recited in claim 1 wherein said mobile platform comprises a motorized vehicle.

* * * * *